United States Patent [19]

Taborsky

[11] 4,093,546
[45] June 6, 1978

[54] BIOLOGICAL FILTER

[76] Inventor: Jiri Taborsky, 5315 8th Ave., Bradenton, Fla. 33505

[21] Appl. No.: 694,721

[22] Filed: Jun. 10, 1976

[51] Int. Cl.² .............................................. C02C 1/04
[52] U.S. Cl. .................................. 210/150; 210/255; 119/2; 119/3
[58] Field of Search ..................... 210/17, 2, 150, 151, 210/255, 259–262, 84, 320, 11, 14, 15, 532 R, 533, 83; 119/1, 2, 3, 15

[56] References Cited

U.S. PATENT DOCUMENTS

| | | | |
|---|---|---|---|
| 1,477,894 | 12/1923 | Perry | 210/151 |
| 2,014,431 | 9/1935 | Foster | 210/255 |
| 2,128,569 | 8/1938 | Velz | 210/320 |
| 2,188,162 | 1/1940 | Schulhoff | 210/151 |
| 3,231,490 | 1/1966 | Fry | 210/17 |
| 3,635,816 | 1/1972 | Golub | 210/2 |

FOREIGN PATENT DOCUMENTS

| | | | |
|---|---|---|---|
| 180,535 | 12/1954 | Australia | 210/255 |
| 19,599 of | 1904 | United Kingdom | 210/150 |

Primary Examiner—Charles N. Hart
Assistant Examiner—Benait Castel
Attorney, Agent, or Firm—Stein & Frijouf

[57] ABSTRACT

An apparatus is disclosed for removing organic waste from a stream of water and for growing Tubifex worms, Chironomidae larvae, infusoria and other like organisms. The apparatus comprises a plurality of pans with each successive pan displaced below the preceding pan so that water is allowed to run therethrough. Dividers are positioned within the pans to entenuate the channel in which the water flows. The organisms are added to collect organic waste, digest it and thereby clear the water. After the organisms multiply to the extent of having a population in excess of the numbers optimal for filtering, the excess is removed from the pans and used as a source of protein for animal feeding.

5 Claims, 6 Drawing Figures

BIOLOGICAL FILTER

BACKGROUND OF THE INVENTION

1. Field of the Invention

This invention relates to an apparatus for removing organic waste from a stream of water and for growing organisms as a source of protein for animal feeding.

2. Description of the Prior Art

Methods for removing organic waste from polluted water disclosed in the prior art utilized fish breeding apparatuses and methods. However, these prior art disclosures are not the most efficient adaptations for utilizing Tubifex worms, Chironomidae larvae, infusoria and other like organisms in removing the organic waste. Therefore, an obvious need in related industries is the development of an apparatus for cleaning organic waste from polluted water by the use of the above-mentioned organisms.

Such an apparatus should incorporate the use of flowing water and preferably a channel long enough to provide sufficient opportunity for the organisms to remove organic waste from such flowing water. This desired apparatus should be capable of systematically growing and harvesting the organisms as an auxiliary and desirable by-product.

As to Tubifex worms and Chironomidae larvae in particular, there is an apparent lack of apparatuses or growing tanks available in the prior art having those environmental features required for the proper growth of these organisms. These organisms must have shallow running water in order to have a habitat in which they can be properly cultivated.

Numerous apparatuses and methods for breeding crustaceans, shrimp, Nauplia larvae, earthworms and fish larvae can be found in the prior art. However, none of these disclose an environment that is suitable for the growth of Tubifex worms and Chironomidae larvae. These growing apparatuses have either, non-circulating water or water that is slowly being recycled at a rate insufficient for the Tubifex worms and Chironomidae larvae. Therefore, there is an obvious need for an apparatus and method with the suitable environmental features for the growth of large quantities of either Tubifex worms or Chironomidae larvae.

SUMMARY OF THE INVENTION

This invention relates to an apparatus for removing organic waste from a stream of water and for growing Tubifex worms and Chironomidae larvae, infusoria and other like organisms as a source of protein for animal feeding. The apparatus comprises a plurality of pans with each successive pan displaced below the preceding pan so that the water is allowed to run therethrough. Dividers are positioned within the pans to extenuate the channel in which the water flows. The organisms added to filter and collect organic waste, digest it and thereby clear the water. Therefore, the organic waste is converted by the organisms to a virtually inert sediment and upon settling to the bottom of the pan means, it is collected between adjacent dams. Periodically this sediment can be cleaned out of the pans. After the organisms multiply to the extent of having a population in excess of the numbers optimal for filtering, the excess is removed from the pans and used as a source of protein for animal feeding.

Tubifex worms should have a fresh water depth of one to two inches whereas the water depth for blood worms should be from one to three inches. Ideal water temperatures for all the organisms is 75° to 80° F, but positive results can occur between 60° to 90° F. Tubifex worms should have running water whereas with the Chironomidae larvae running water is preferably but not necessary.

The polluted water that is processed through the biological filter could preferably come from the discharge of dairies, slaughter houses, sugar refineries or the like.

An apparatus for carrying out the above-described method is embodied in the apparatus of the present invention as hereinafter described.

The biological filter comprises a plurality of pan means each having a bottom portion and a rim portion. Each pan means has rigidly secured therein a plurality of spaced apart parallel divider means disposed along the pan means. One end of each of the divider means is attached to the rim portion while the opposite end is spaced apart from the rim portion. Each successive divider means alternate the disposition of their attached ends with their oppositely disposed, spaced apart ends so that spaced apart ends always adjacent to attached end of the next divider. This arrangement creates a continuous extenuated channel having a substantially circuitous route. The extenuated channel created by the divider means and the use of numerous pan means greatly increases the length of the path along which the flowing water will travel. Therefore, the opportunity for organic waste to be collected by the organisms is increased, while keeping the water moving at a substantial rate. In other words, the rate at which the water flows does not have to be compromised in the present invention in order to provide sufficient time for the organisms to filter the water. For each pan means water enters at the inlet of the continuous channel and exits at the outlet of the continuous channel by way of drain means. In FIG. 1 and in FIG. 2 directional arrows indicate the direction and the path in which the water flows.

At the end of the continuous channel but disposed before the water flow reaches drain means is gate means. Gate means is disposed between the wall of the channel means and has a longitudinal lower edge movably engaging the bottom portion. When in this position, the water flow is forced over the top of the upper longitudinal edge of the gate means. The gate means is attached to the sides of the walls of the continuous channel and is in sliding engagement with the channel walls. The vertical dimensions of this gate will determine the depth of the water contained within each pan means. The raising of the gate means results in the water flow going under the gate means instead of being forced in its normal flow over the upper edge of the gate means and in this way unwanted accumulated sediment can be washed out of the channel means.

In the first embodiment of the present invention, positioned within each pan means is a plurality of vertically upright dam means perpendicular to the adjacent divider means so that their longitudinal axis or substantially transverse to the direction of water flow. The dam means extends vertically upward to a height less than that of the rim portion and divider means. In this manner, water can be forced to pass over the upright longitudinal edge of the dam means so that organic sediment present in the water can be trapped and collected.

In another embodiment of the present invention, a plurality of parallel spaced apart porous panel means are positioned in the channel, each having its longitudinal axis parallel to the divider means. In this embodiment, the dam means are not present. The porous panel means provide a suitable habitat therein for the organisms. The spaces between adjacent porous panel means provide a path for the water so as not to substantially interrupt its flow.

By the use of numerous pan means and divider means therein the channel for the water is extended so that there will be sufficient opportunity for the organic waste to be removed by the organisms. The divider means positioned within each pan means creates a relatively long channel in which the water must flow. This extenuated channel allows for uniformity in the exposure of the polluted water to the organisms. In addition, such a configuration of divider means increases the rate of flow of the water within each pan means. This is of a particular advantage for creating the proper environment suitable to the Tubifex worms and the Chironomidae larvae. Tubifex worms must have an environment of shallow running water and Chironomidae larvae must have an environment of shallow water and survive better in running water.

The invention accordingly comprises the features of construction, combination of elements and arrangement of parts which will be exemplified in the construction thereinafter set forth, and the scope of the invention will be indicated in the claims.

BRIEF DESCRIPTION OF THE DRAWINGS

For a fuller understanding of the nature and objects of this invention, reference should be had to the following detailed description taken in connection with the accompanying drawings in which.

Similar reference characters refer to similar parts throughout several views of the drawings.

DETAILED DESCRIPTION

An important purpose of the biological filter of the present invention is for use in removing organic waste from a stream of water. An additional purpose of the invention is to provide a medium for growing and harvesting organisms, such as Tubifex worms, Chironomidae larvae, infusoria and other like organisms for further use, such as food for tropical fish. A plurality of pan means 1 are established with water being directed to run therethrough. Organisms are added to filter and collect the organic waste, digest it and thereby clear the water.

Figure 1:
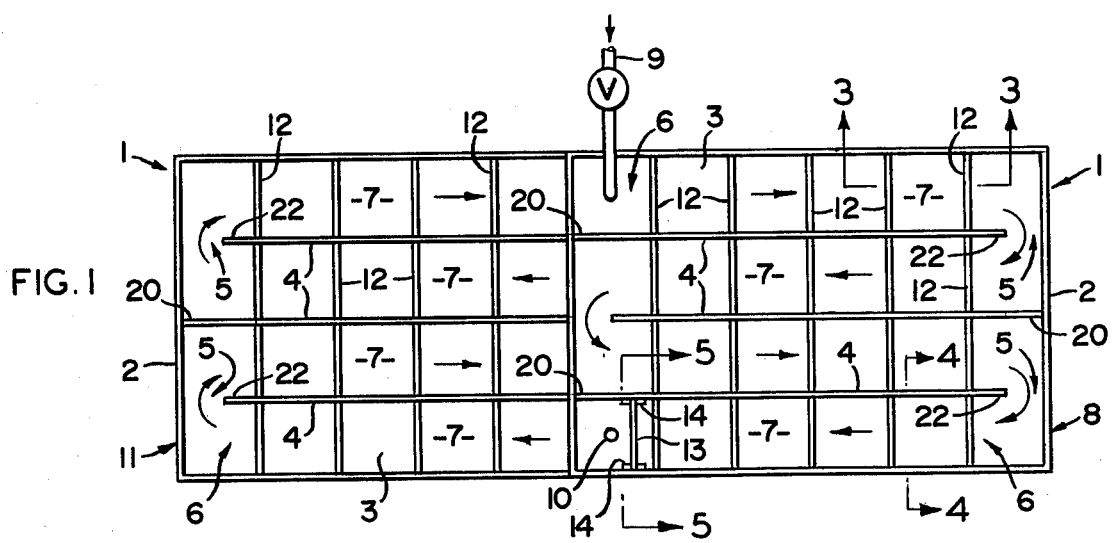
FIG. 1 is a top view of the biological filter.
Figure 2:
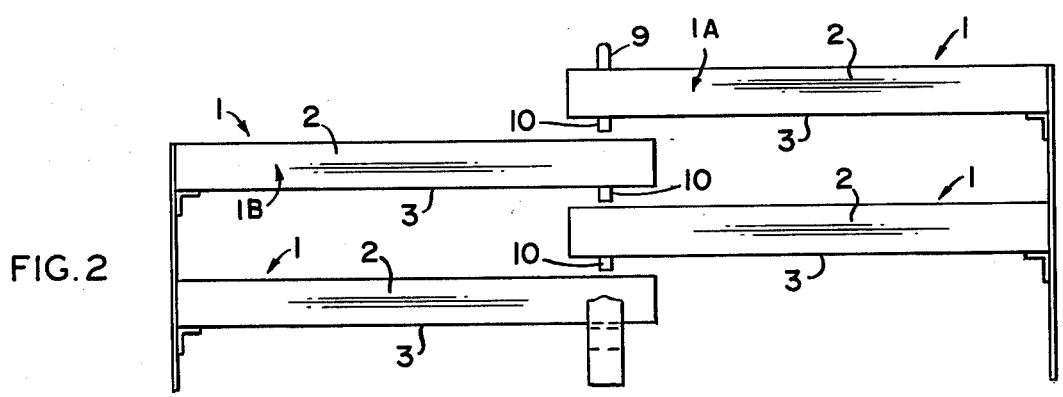
FIG. 2 is a side view of the biological filter.

Apparatus for carrying out the above-described method is shown in FIGS. 1-6. Referring to FIGS. 1 and 2, there is disclosed a plurality of pan means 1 each including a bottom portion 3 and a rim portion 2. Each pan means 1 has rigidly secured therein a plurality of spaced apart parallel divider means 4 disposed along the longitudinal dimension of the pan means 1. One end of each of the divider means 4 is attached to the rim portion 2 while the opposite end is spaced apart from the rim portion 2 to form corner channel 5. Each successive divider means 4 alternate the disposition of their attached end 20 with their oppositely disposed, spaced apart end 22 so that a spaced apart end 22 is always adjacent to an attached end 20 of the next divider. This arrangement creates a continuous channel 6 which includes longitudinal channels 7 along the longitudinal dimension of the divider means 4 and the corner channels 5 at the end of divider means 4. In FIG. 1 four divider means 4 are disposed within each pan means 1, however, any number of dividers in side-by-side position may be utilized. For each pan means 1 water enters at the inlet of the continuous channel 6 and exits at the outlet of the continuous channel 6 by way of drain means 10.

Figure 3:
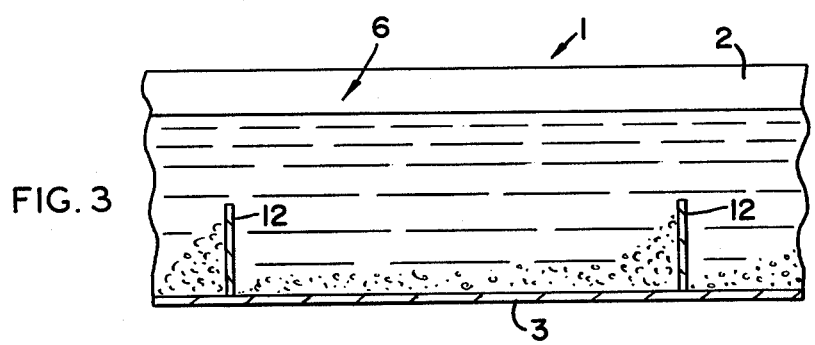
FIG. 3 is a sectional view along line 3—3 of FIG. 1 of the dam means of the present invention.
Figures 4, 5, 6:
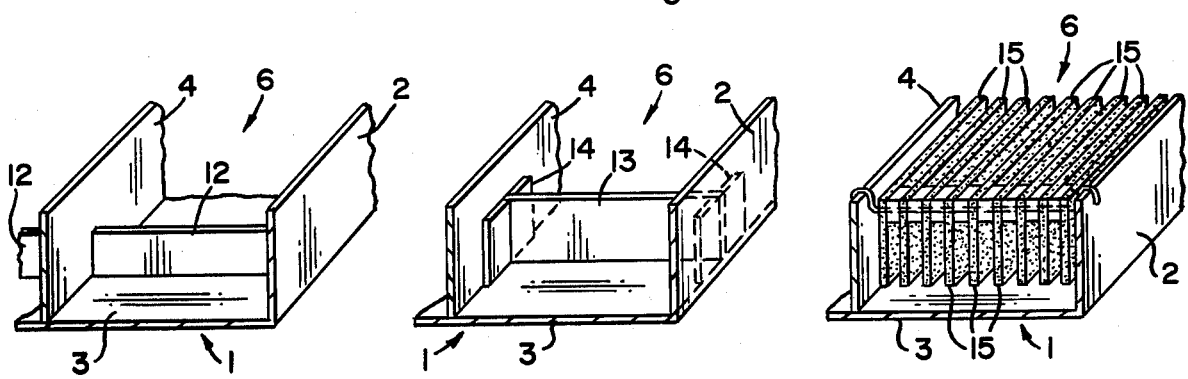
FIG. 4 is a sectional view taken along line 4—4 of FIG. 1 of the dam means.
FIG. 5 is a sectional view in partial cutaway along line 5—5 of FIG. 1 disclosing the gate means.
FIG. 6 is a sectional, detailed view of another embodiment having filter means disposed on the dam means.

In the first embodiment of the present invention positioned within each pan means 1 as shown in FIG. 3 and FIG. 4 is a plurality of vertically upright dam means 12 that are perpendicular to the adjacent divider means 4 so that their longitudinal axis are transversed to the direction of the water flow. The dam means 12 completely extends between the walls of continuous channel 6. The lower longitudinal edge of the dam means 12 are aligned along the bottom portion 3 of the pan means 1 and the dam means 12 extends vertically upward to a height less than that of the rim portion 2 and divider means 4. In this manner, water can be forced to pass over the upper longitudinal edge of the dam means 12 so that organic sediment present in the water can be trapped and collected.

As shown in FIG. 1 at the end of the continuous channel 6 but disposed before the water flow reaches drain means 10 is gate means 13. Gate means 13 is disposed between the wall of channel means 6 and has a longitudinal lower edge movably engaging the bottom portion 3. When in this position, the water flow is forced over the top of the upper longitudinal edge of the gate means 13. As shown in FIG. 5 gate means 13 is attached to the sides of the walls of the continuous channel 6 and is in sliding engagement with grooved retainer means 14 extending vertically up the channel walls. However, the gate means 13 may be attached with any other suitable means of attachment, such as pivot means, in which the lower longitudinal edge of the gate means 13 is raised. This raising of the gate means 13 results in the water flow going under the gate means 13 instead of being forced in its normal flow over the upper edge of the gate means 13 and unwanted accumulated sediment can be washed out of channel means 6.

A second embodiment of the present invention is shown in FIG. 6, including a plurality of parallel spaced apart porous panel means 15 positioned in continuous channel means 6. Each of the panel means 15 had an elongated configuration with longitudinal axis parallel to the divider means 4. In this embodiment, the dam means 12 are not present. The porous panel means 15 provide a suitable habitat therein for the organisms with the spaces between adjacent porous panel means 15 providing a path for the water, so as not to substantially interrupt its flow. Organisms attach to the surface or inhabit the pores of the porous panel means 15. These panels create an expanded surface that is covered with organisms and are exposed to the water flow.

Referring to FIG. 2, water is introduced into first pan means 1A at the inlet or beginning of continuous channel means 6 by way of water source means 9 so that water is channeled through the pan means 1 by divider means 4 and exits by way of the drain means 10. Each is established pan means to permit the emptying of water to the next successive pan means. Thus, a second pan means 1B is shown positioned lower than first pan means 1A. Water exiting from the drain means 10 of first pan means 1A drops into the beginning or inlet of the continuous channel means 6 of the successive second pan means 1B. Since each successive pan means 1 is preferably constructed in the same manner as the preceding pan means 1, the flowing of water through successive pans while in the above manner continue for any number of cascaded pan means 1.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted a illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:

1. Apparatus for cultivating organisms and for filtering water from a water source by use of the organisms to remove organic waste present therein comprising: a plurality of pan means including first pan means, said plurality of pan means each comprising a bottom portion and a rim portion extending in upwardly protruding relationship to said bottom portion, each of said plurality of pan means having rigidly secured therein a plurality of spaced apart divider means disposed adjacent the bottom portion of each of said pan means; said plurality of divider means being in substantially parallel relationship; one end of each of said parallel divider means abutting said rim portion with the opposite end of each of said parallel divider means being spaced apart from said rim portion, each successive divider means having said spaced apart end disposed in substantially reversed disposition relative to each preceding divider means forming a continuous extenuated channel between adjacent divider means; said continuous extenuated channel having an inlet for receiving water and an outlet disposed to pass water to drain means; said pan means being disposed in successively lower disposition than the next preceding pan means, the water source disposed to provide water to said inlet of said first pan means, said drain means formed within the bottom of each of said pan means and disposed in fluid communication with said inlet of the next subsequent successive pan means, whereby water flows along said extenuated channels of each of said pan means in successive order; and dam means transversely disposed relative to the sides of said channel and extenuating therebetween, said dam means extending vertically upward to a height less than said rim portion and said divider means whereby the flowing water is forced to pass over the upper longitudinal edge of said dam means and organic sediment present in the water is trapped.

2. Apparatus as in claim 1 further comprising gate means slidingly engaging the walls of said channel and completely extending therebetween and relative to the flow of water in said channel, said gate means being disposed upstream relative to said drain means.

3. Apparatus as in claim 2 wherein said gate means has a height less than the walls of said channel, and said gate means having a normal position of removably engaging the bottom of said channel, whereby when said gate means is in normal position the flowing water is forced over the upper longitudinal edge of said gate means.

4. Apparatus as in claim 3 wherein said gate means has a spaced apart position in which said gate means is spaced apart from the bottom of said channel, whereby when said gate means is in said spaced apart position the flowing water passes under said gate means cleaning out the unwanted sediment.

5. Apparatus for cultivating organisms and for filtering water from a water source by use of the organisms to remove organic waste present therein comprising: a plurality of pan means including first pan means, said plurality of pan means each comprising a bottom portion and a rim portion extending in upwardly protruding relationship to said bottom portion, each of said plurality of pan means having secured therein a plurality of spaced apart divider means disposed adjacent the bottom portion of each of said pan means; said plurality of divider means being in substantially parallel relationship; one end of each of said parallel divider means abutting said rim portion with the opposite end of each of said parallel divider means being spaced apart from said rim portion, each successive divider means having said spaced end disposed in substantially reverse disposition relative to each preceding divider means forming a continuous extenuated channel between adjacent divider means; said continuous extenuated channel having an inlet for receiving water and an outlet disposed to pass water to a drain means; said pan means being disposed in successively lower disposition than the next preceding pan means, the water source disposed to provide water to said inlet of said first pan means, said drain means formed within the bottom of each of said pan means and disposed in fluid communication with said inlet of the next subsequent successive pan means, whereby water flows along said extenuated channels of each of said pan means in successive order; and a plurality of spaced apart parallel porous panels disposed in parallel adjacent relationship to said divider means and positioned in said channel.

* * * * *

UNITED STATES PATENT AND TRADEMARK OFFICE
CERTIFICATE OF CORRECTION

PATENT NO. : 4,093,546
DATED : June 6, 1978
INVENTOR(S) : Jiri Taborsky

It is certified that error appears in the above-identified patent and that said Letters Patent are hereby corrected as shown below:

```
Column 2, line  5, delete "preferably" and insert
                    --preferable--;

line 23, after "ends" insert --are--;
          line 23, after "to" insert --the--;
          line 60, delete "or" and insert --are--;

Column 4, line 55, delete "had" and insert --has--;

Column 5, line  2, delete "is";
          line  3, delete "established"
          line  3, after "means" insert --is established--.
```

Signed and Sealed this

Twelfth Day of December 1978

[SEAL]

Attest:

RUTH C. MASON
Attesting Officer

DONALD W. BANNER
Commissioner of Patents and Trademarks